United States Patent [19]

Lew et al.

[11] Patent Number: 4,603,595
[45] Date of Patent: Aug. 5, 1986

[54] COMMON APEX DOUBLE CONE VARIABLE SPEED MECHANICAL TRANSMISSION

[76] Inventors: Hyok S. Lew, 7890 Oak St., Arvada, Colo. 80005; Michael Stranahan, P.O. Box 15, Woody Creek, Colo. 81656

[21] Appl. No.: 674,501

[22] Filed: Nov. 23, 1984

[51] Int. Cl.[4] .................... F16H 15/16; F16H 15/00; F16H 15/56
[52] U.S. Cl. ........................................ 74/191; 74/190; 74/772
[58] Field of Search ................ 74/191, 192, 193, 190, 74/206, 796, 772

[56] References Cited

U.S. PATENT DOCUMENTS

| | | | |
|---|---|---|---|
| 1,050,704 | 1/1913 | Sparks | 74/191 |
| 1,468,401 | 9/1923 | Roberts | 74/193 |
| 1,489,521 | 4/1924 | Conrad | 74/193 |
| 1,624,097 | 4/1927 | Gensmer | 74/772 |
| 1,638,689 | 8/1927 | Gensmer et al. | 74/772 |
| 2,255,200 | 9/1941 | Wahl | 74/772 |
| 2,306,475 | 12/1942 | Wahl | 74/772 |
| 3,207,004 | 9/1965 | Chery | 74/798 |
| 4,499,781 | 2/1985 | Lew | 74/191 |
| 4,515,028 | 5/1985 | VanDerLinden et al. | 74/191 |

Primary Examiner—Kenneth J. Dorner
Assistant Examiner—Mike Bednarek

[57] ABSTRACT

This invention relates to a variable speed mechanical transmission of friction drive type comprising a pair of coaxially disposed stepped conical friction drive surfaces providing a series of conical frustum shell spaces disposed in a stepwise arrangement therebetween. The extensions of the inner and outer conical surfaces constituting each conical frustum shell space have common apex point. Each conical frustum shell space includes a plurality of conical frustum rollers rotatably secured in axisymmetrically distributed positions therewithin wherein the extension of the conical surface of each conical frustum roller has the same apex point as that of the inner and outer conical surfaces confining thereof when said conical frustum rollers are under line contact with both of the inner and outer conical surfaces confining thereof. Each set of the plurality of conical frustum rollers disposed in each conical frustum shell space has means for pulling away from and pushing toward the common apex point over a small distance relative to the inner and outer conical surface constituting each conical frustum shell space which means establishes and relieves the line contact between the conical frustum rollers and the inner as well as the outer conical surfaces confining those conical frustum rollers. A transmission speed selector establishes a frictional contact between the conical frustum rollers and the inner and outer conical surfaces confining thereof for only one combination comprising a set of conical frustum rollers and the inner and outer conical surfaces at one time and, consequently, provides a stepwisely variable speed transmission between the inner cone and the outer cone including the series of stepped inner and outer conical surfaces, respectively. The transmission speed selector also includes means for relieving the frictional contact between the set of conical frustum rollers and inner and outer conical surfaces confining thereof for all combinations and, consequently, provides a built-in clutch for the stepwise variable speed mechanical transmission of the present invention.

9 Claims, 9 Drawing Figures

COMMON APEX DOUBLE CONE VARIABLE SPEED MECHANICAL TRANSMISSION

BACKGROUND OF THE INVENTION

There have been numerous efforts by many inventors and engineers to create a continously variable speed conical friction drive mechanical transmission wherein a nonslipping line contact between the driving and driven surfaces is realized. The nonslipping line contact is the most important issue in the friction drive system because it enables the mechanical transmission to transmit much greater power by the friction drive method compared with the point contact friction drive that is employed in all existing variable speed friction drive systems with few exceptions. according to mathematical principles, a nonslipping line contact between the conical surfaces under frictional contact is possible if and only if all conical surfaces involved in the friction drive have a common apex point. It is theoritically impossible to satisfy such a condition when one attempts to construct a friction drive including a pair of coxially disposed conical surfaces and a plurality of cylindrical or conical rollers shiftably confined therebetween. This is the exact reason why everyone has failed to come up with a nonslipping line contact continuously variable speed friction drive system.

The primary object of the present invention is to provide a stepwise variable speed mechanical transmission of a conical friction drive type wherein the principle of nonslipping line contact friction drive is realized.

Another object of the present invention is to provide a nonslipping line contact conical friction drive that includes a built-in clutch system.

A further object of the present invention is to provide a stepwise variable friction drive employing different sets of friction rollers for different speed transmissions.

Yet another object of the present invention is to provide a stepwise variable mechanical transmission comprised of inner and outer conical surfaces providing a series of conical frustum shell spaces therebetween and a plurality of sets of conical frustum rollers wherein each set of conical frustum rollers are disposed within each conical frustum shell space in such a way that all conical surfaces involved in the friction drive in each conical frustum shell space has a common apex point.

Yet a further object of the present invention is to provide means for establishing the frictional contact between the set of conical frustum rollers and the inner and outer conical surfaces confining thereof for one set of the conical frustum rollers in one conical frustum shell space at one time.

Still another object of the present invention is to provide means for relieving all frictional contacts between the set of conical frustum rollers and the inner and outer conical surfaces confining thereof for all sets of conical frustum rollers.

Still a further object of the present invention is to provide a mechanical transmission of high power transmission capability at an economic cost.

These and other objects of the present invention will become clear as the description thereof proceeds.

BRIEF DESCRIPTION OF FIGURES

The present invention may be described with a greater clarity and specificity by referring to the following figures.

DESCRIPTION OF THE PREFERRED EMBODIMENTS

Figure 1:
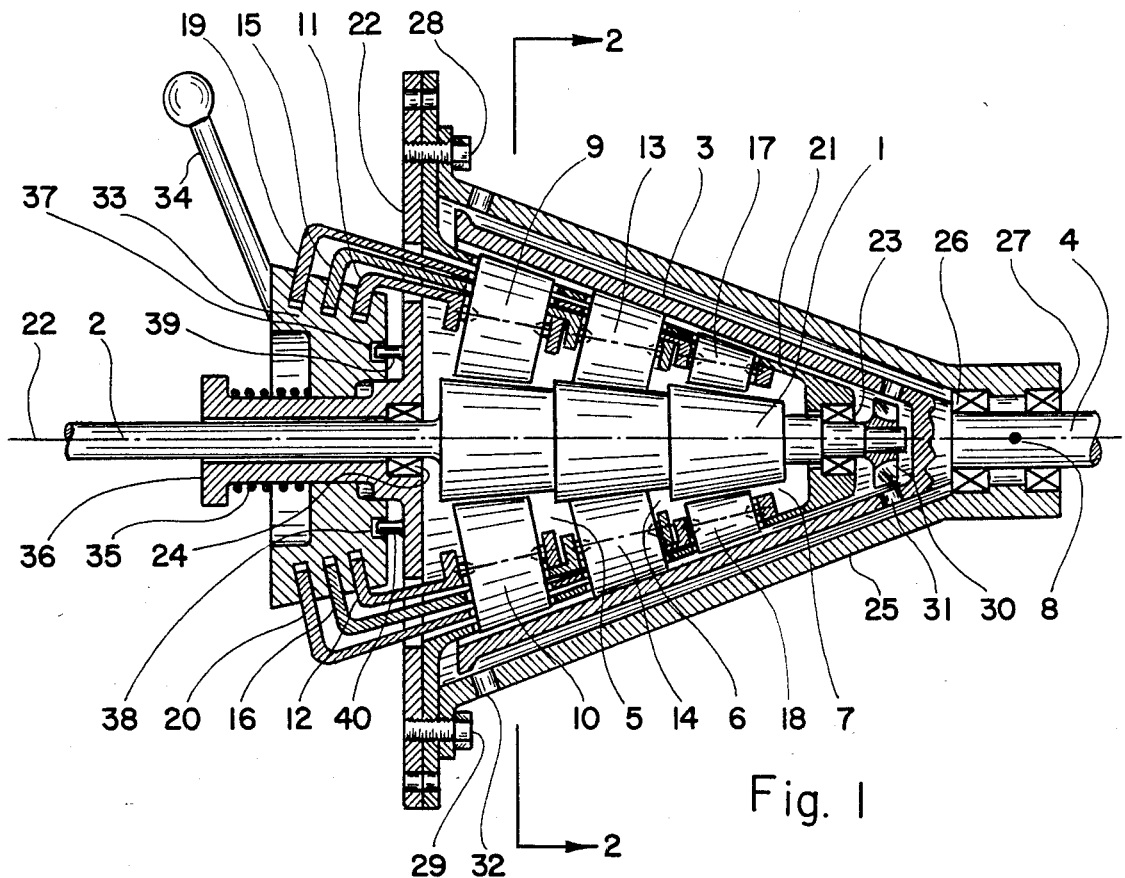
FIG. 1 illustrates a cross section of a common apex double cone variable speed mechanical transmission constructed in accordance with the principles of the present invention.

In FIG. 1 there is illustrated a cross section of a nonslipping line contact friction drive mechanical transmission constructed in accordance with the principles of the present invention, which cross section is taken along a plane including the central axis of the mechanical transmission. The mechanical transmission called "Common Apex Double Cone Variable Speed Mechanical Transmission" is comprised of an inner conical wheel 1 of the stepped construction rigidly connected to a first shaft 2, and an outer conical wheel 3 rigidly connected to a second shaft 4, wherein the inner and outer conical wheels are rotatably disposed in a coaxial relationship. The inner surface of the outer conical wheel 3 commonly called the outer conical surface and the outer surface of the inner conical wheel 1 commonly called the inner conical surface provides a series of conical frustum shell spaces 5, 6, 7, etc. therebetween, which is of a stepped construction as the inner conical surface has a stepped construction. The extensions of the outer and inner conical surfaces constituting each conical frustum shell space converge to a common apex point 8. In the particular embodiment shown in FIG. 1, the extensions of all conical surfaces converge to the common apex point 8 as the outer conical surface is a single continuous conical surface. each conical frustum shall space includes a set of conical frustum rollers axisymmetrically distributed about the inner conical wheel and rotatably secured to a support member. For example, the conical frustum shell space 5 includes a set of conical frustum rollers 9, 10, etc. rotatably secured to the support members 11, 12, etc., respectively. The conical frustum shell space 6 includes set of conical frustum rollers 13, 14, etc. rotatably secured to the support members 15, 16, etc., respectively. The conical frustum shell space 7 includes a set of conical frustum rollers 17, 18, etc. rotatably secured to the support members 19, 20, etc., respectively. Each conical frustum roller included in each conical frustum shell space has the same apex point as the common apex point of the inner and outer conical surfaces constituting that conical frustum shell space, when the conical surface of each conical frustum roller is simultaneously in contact the inner and outer conical surface of that conical frustum shell space. In the particular embodiment shown in FIG. 1, every conical frustum roller has the same apex point 8 as that of the inner and outer conical surfaces, when that conical frustum roller is in contact with both of the inner and outer conical surfaces. The roller supporting members 11, 12, 15, 16, 19, 20, etc. are supported by a supporting conical shell 21 wherein they are not rotatable about the central axis 22 of the transmission, while they are slidable over a small distance in a direction substantially parallel to the central axis of the conical frustum rollers which they are rotatably supporting. The combination including the inner conical wheel 1 and the shaft 2 is rotatably supported by the bearings 23 and 24 affixed to the supporting conical shell 21 and the end plate 22, respectively. The combination including the outer conical wheel 3 and the shaft 4 is rotatably supported by the bearings 26 and 27 affixed to the conical shell housing 25. The flanges of the supporting conical shell 21 and the conical shell housing 25 are connected to the end plate 22 by a plurality of bolts 28, 29, etc. The blower turbine blades 30 affixed to one extremity of the shaft 2 moves air through the series of conical frustum shell spaces and through the air holes 31, 32, etc., which air circulation cools the inner and outer conical wheels, the conical frustum rollers, bearings, etc. The angled extremities of the roller supporting members 11, 12, 15, 16, 19, 20, etc. engage a plurality of the grooves included in the conical frustum surface of the speed control wheel 33 including a speed control means such as the handle 34 used to rotate the speed control wheel 33. The speed control wheel 33 is spring biased by a coil spring 35 against the flange 36 extending from the hub of the end plate 22. One end face of the control wheel 33 adjacent to the end plate 22 includes a plurality of the grooves 37, 38, etc. coaxially disposed with respect to the central axis 22 of the mechanical transmission. A plurality of posts 39, 40, etc. extending from the end plate 22 slidably engage the grooves 37, 38, etc.

Figure 2:
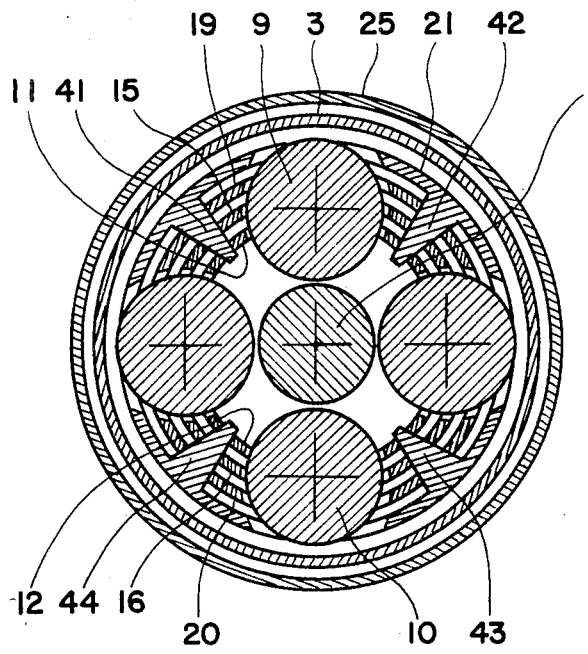
FIG. 2 illustrates another cross section of the mechanical transmission shown in FIG. 1 taken along a plane 2—2 as shown in FIG. 1.

In FIG. 2 there is illustrated a cross section of the mechanical transmission shown in FIG. 1 taken along a plane 2—2 as shown in FIG. 1. A plurality of guide ribs 41, 42, 43, 44, etc. extending inwardly from the supporting conical shell 21 in the radial directions retain the roller mounting members 11, 12, 15, 16, 19, 20, etc., in position in a nonrotatable and slidable relationship.

Figure 3:
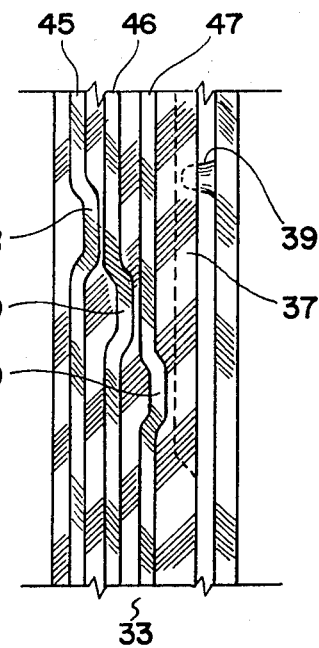
FIG. 3 illustrates a developed view of the cylindrical surface of the transmission speed control wheel.

In FIG. 3 there is illustrated a developed view of the conical frustum surface of the speed control or shift wheel 33. The grooves 45, 46, 47, etc. disposed in the conical frustum surface of the shift wheel 33 and respectively accepting the angled extremities of the roller supporting members 11, 12, 15, 16, 19, 20, etc. include "transmission-on" portions 48, 49, 50, etc., respectively wherein each "transmission-on" portion of each groove is disposed at different angular positions whereby only one set of conical frustum rollers included in one conical frustum shell space establishes the frictional contact with the inner and outer conical surfaces at a given time. The grooves 37, 38, etc. included in one end face of the shift wheel 33 and slidably engaged by the posts 39, 40, etc. extend over the angular ranges including the "transmission-on" portions of the grooves 45, 46, 47, etc. and terminated therebeyond.

When the shift wheel 33 is rotated to an angular position where the post 39 extending from the end plate 22 exits the groove 37, the shift wheel 33 is pushed away from the end plate 22 and, consequently, every set of conical frustum rollers is relieved from the frictional contact with the inner and outer conical surfaces. Therefore, the combination of the grooves 37, 39, etc. and the posts 39, 40, etc. provides a built-in clutch means for the mechanical transmission shown in FIGS. 1, 2 and 3. Of course, the desired transmission speed is obtained by turning the shift wheel 33 to an angular position where the roller supporting members supporting a specific set of conical frustum rollers that provides the desired transmission ratio, become positioned at the "transmission-on" portions of the appropriate groove. For example, the "transmission-on" position 48 provides the highest speed, 49 the medium speed, 50 the lowest speed and disengagement by the clutch at a position beyond the "transmission-on" position 50. Consequently, the handle 34 affixed to the shifting wheel 33 enables one to shift the transmission to a desired speed as well as to the idle position, which shifting is executed by rotating the speed control or shifting wheel 33 in either direction. It should be noticed that in FIG. 1, only the set of the conical frustum rollers 13, 14, etc. are in frictional contact with the inner and outer conical surfaces, while all other sets of conical frustum rollers are desengaged from frictional contact with the inner and outer conical surfaces. It should be understood that the object of the nonslip line contact friction drive is accomplished by the mechanical transmission shown in FIGS. 1, 2 and 3, only because every conical friction drive surface included in each combination of the friction drive has an apex point coinciding with the common apex point, which common apex point may be different for different transmission ratios, or may be one single point for all transmission ratios depending on the arrangement of the inner and outer conical surfaces. The embodiment shown in FIG. 1 has a universally common apex point 8 because the outer conical surface is a single continuous conical surface that determines the universally common apex point, while the inner conical surface is of a stepped-up configuration toward the converging extremity of the conical surfaces.

Figure 4:
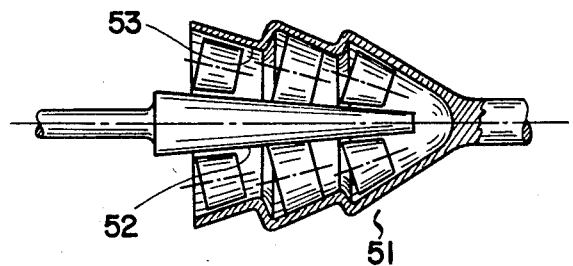
FIG. 4 illustrates a cross section of another embodiment of the variable speed mechanical transmission of the present invention.

In FIG. 4 there is shown a cross section of another embodiment of the common apex double cone variable speed mechanical transmission constructed essentially in the same way as that shown in FIGS. 1, 2 and 3. For brevity of the pictorial presentation, only those elements directly involved in the friction drive are included in FIG. 4, while other accessory elements already described in conjunction with FIGS. 1, 2 and 3 are omitted from FIG. 4. The mechanical transmission 51 shown in FIG. 4 is comprised of a single continuous inner conical surface 52 and an outer cylindrical surface 53 of a stepped-up configuration toward the converging extremity of the conical surfaces. Every conical surface directly involved in the friction drive has an apex point coinciding with the universally common apex point defined by the inner conical surface.

Figure 5:
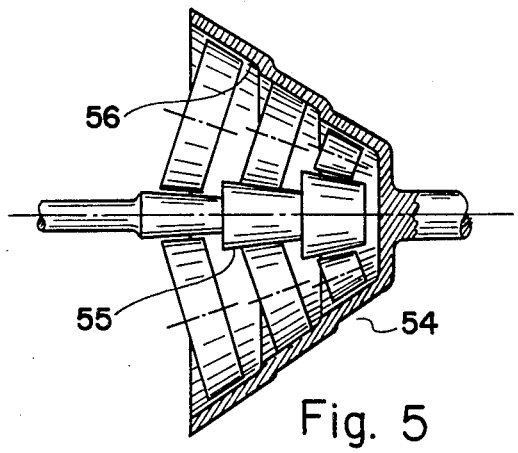
FIG. 5 illustrates a cross section of a further embodiment of the variable speed mechanical transmission of the present invention.

In FIG. 5 there is illustrated a cross section of a further embodiment of the common apex double cone variable speed mechanical transmission 54 comprising a stepped-up inner conical surface 55 and a stepped-down outer conical surface 56. In this combination, different combinations of the friction drive included in different conical frustum shell spaces may have different common apex points and, consequently, there need not exist the universally common apex point.

Figure 6:
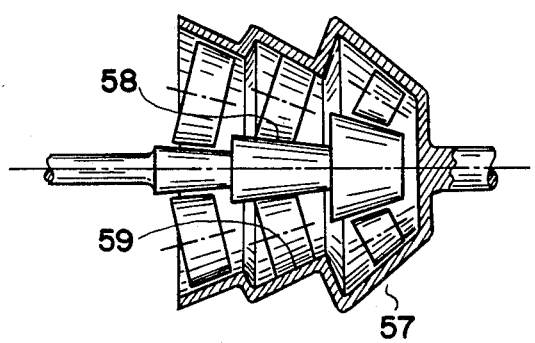
FIG. 6 illustrates a cross section of yet another embodiment of the variable speed mechanical transmission of the present invention.

The mechanical transmission 57 shown in FIG. 6 includes a stepped-up inner conical surface 58 and a stepped-up outer conical surface 59. The common apex points of different combinations of the friction drive may be or may not be the same.

Figure 7:
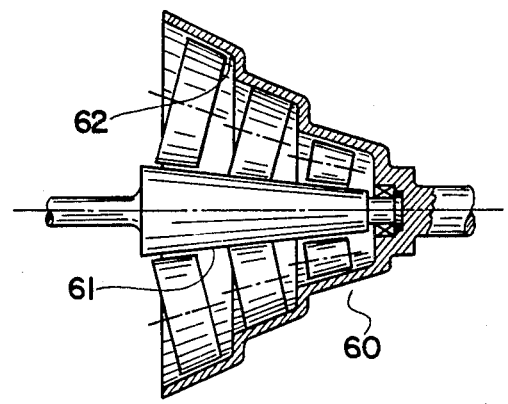
FIG. 7 illustrates a cross section of yet a further embodiment of the variable speed mechanical transmission of the present invention.

The mechanical transmission 60 illustrated in FIG. 7 has a single continous inner conical surface 61 and a stepped-down outer conical surface 62. There exists the universally common apex point for all conical friction drive surfaces included in this embodiment by virtue of the single continuous inner conical surface.

Figure 8:
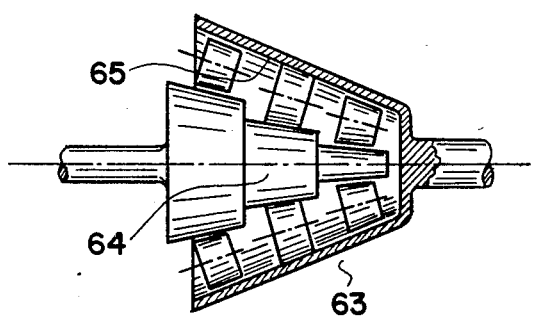
FIG. 8 illustrates a cross section of still another embodiment of the variable speed mechanical transmission of the present invention.

In FIG. 8 there is illustrated a mechanical transmission 63 including a stepped-down inner conical surface 64 and a single continuous outer conical surface 65. This embodiment has the universally common apex point by virtue of the single continuous outer conical surface.

Figure 9:
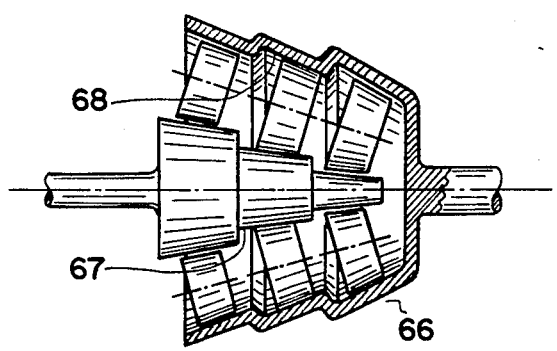
FIG. 9 illustrates a cross section of still a further embodiment of the variable speed mechanical transmission of the present invention.

In FIG. 9 there is illustrated a mechanical transmission 66 including a stepped-down inner conical surface 67 and a stepped-up outer conical surface 68. This particular embodiment is arranged in such a way that every conical surface involved in the friction drive has a common apex point that coincides with the universally common apex point. However, other embodiments similar to this having the stepped conical surfacea of different designs may not have the universally common apex point. It should be understood that the condition of the "nonslip line contact" friction drive becomes satisfied as long as each combination of the friction drive comprising each of the series of the stepped conical frustum shell spaces has the common apex point, even though the common apex points of different conical frustum shell spaces differ from each other.

It should be mentioned that a common apex double cone variable speed mechanical transmission taught by the principles of the present invention may include transmission ratios of much greater numbers than three employed in the illustrative embodiments, which is made possible by the extremely compact elements and dense packaging feasible in the practice of the present invention. As a consequence, the stepwise variable mechanical transmission of the present invention can be made to approach a continuously variable mechanical transmission.

While the principles of the present invention have now been made clear by the illustrative embodiments, it will be immediately obvious to those skilled in the art that many modifications can be made of the arrangements, elements, proportions, structures and materials, which are particularly adapted to the specific working environments and operating conditions in the practice of the invention without departing from those principles.

We claim:

1. A mechanical transmission device for transmitting power from a first shaft to a second shaft and vice versa comprising in combination:
   (a) a first hollow rotating member including an internal conical surface coaxially disposed with respect to said first shaft wherein extension of said internal conical surface converges to a single apex point, said first hollow rotating member nonrotatably coupled to said first shaft;
   (b) a second rotating member including a plurality of external conical surfaces disposed in series and coaxially with respect to said second shaft wherein extensions of said plurality of external conical surfaces converge to said single apex point, said second rotating member nonrotatably coupled to said second shaft and rotatably disposed within said internal conical surface included in said first hollow rotating member in a coaxial relationship, wherein a series of conical frustum shell surfaces are provided intermediate said internal conical surface of said first hollow rotating member and said plurality of external conical surfaces of said second rotating member;
   (c) a plurality of sets of conical frustum rollers rotatably and nonorbitably disposed within plurality of said conical frustum shell spaces, each set of said conical frustum rollers disposed in each conical frustum shell space of said plurality of conical frustum shell spaces frictionally coupling rotating movements of said first hollow rotating member and said second rotating member when said conical frustum rollers are simultaneously in contact with said internal conical surface of said first hollow rotating member and one of said external conical surfaces of said second rotating member; and
   (d) means for selectively establishing a simultaneous frictional contact between one set of said conical frustum rollers and said internal conical surface of said first hollow rotating member and one of said external conical surfaces of said second rotating member;

whereby, rotational motions of said first and second shafts are coupled to one another at various transmission ratios depending on different set of said conical frustum rollers selectively establishing frictional coupling of rotating movements of said first hollow rotating member and said second rotating member.

2. The combination as set forth in claim 1 wherein said simultaneous frictional contact between each set of said conical frustum rollers and said internal conical surface of said first hollow rotating member and said external conical surface of said second rotating member is spring biased.

3. The combination as set forth in claim 1 wherein said combination includes means for simultaneously disengaging frictional contact between all sets of said conical frustum rollers and said internal conical surface of said first hollow rotating member and all of said external conical surfaces of said second rotating member; whereby, said means provides function of clutch.

4. A mechanical transmission device for transmitting power from a first shaft to a second shaft and vice versa comprising in combination:
   (a) a first hollow rotating member including a plurality of internal conical surfaces disposed in series and coaxially with respect to said first shaft wherein extensions of said plurality of internal conical surfaces converge to a single apex point, said first hollow rotating member nonrotatably coupled to said first shaft;
   (b) a second rotating member including an external conical surface disposed coaxially with respect to said second shaft wherein extension of said external conical surface converges to said single apex point, said second rotating member nonrotatably coupled to said second shaft and rotatably disposed within said plurality of internal conical surfaces included in said first hollow rotating member in a coaxial relationship, wherein a series of conical frustum shell spaces are provided intermediate said plurality of internal conical surfaces of said first hollow rotating member and said external conical surface of said second rotating member;

(c) a plurality of sets of conical frustum rollers rotatably and nonorbitably disposed within plurality of said conical frustum shell spaces, each set of said conical frustum rollers disposed in each conical frustum shell space of said plurality of conical frustum shell spaces frictionally coupling rotating movements of said first hollow rotating member and said second rotating member when said conical frustum rollers are simultaneously in contact with one of said plurality of internal conical surface of said first hollow rotating member and said external conical surface of said second rotating member; and (d) means for selectively establishing a simultaneous frictional contact between one set of said conical frustum rollers and one of said plurality of internal conical surfaces of said first hollow rotating member and said external conical surface of said second rotating member;

whereby, rotational motions of said first and second shafts are coupled to one another at various transmission ratios depending on different set of said conical frustum rollers selectively establishing frictional coupling of rotating movements of said first hollow rotating member and said second rotating member.

5. The combination as set forth in claim 4 wherein said simultaneous frictional contact between each set of said conical frustum rollers and said internal conical surface of said first hollow rotating member and said external conical surface of said second rotating member is spring biased.

6. The combination as set forth in claim 4 wherein said combination includes means for simultaneously disengaging frictional contact between all sets of said concical frustum rollers and all of said plurality of internal conical surface of said first hollow rotating member and said external conical surface of said second rotating member; whereby, said means provides function of clutch.

7. A mechanical transmission device for transmitting power from a first shaft to a second shaft and vice versa comprising in combination:

(a) a first hollow rotating member including a plurality of internal conical surfaces disposed in series and coaxially with respect to said first shaft wherein extensions of said plurality of internal conical surfaces converge to a single apex point, said first hollow rotating member nonrotatably coupled to said first shaft;

(b) a second rotating member including a plurality of external conical surfaces disposed in series and coaxially with respect to said second shaft wherein extensions of said plurality of external conical surfaces converge to said single apex point, said second rotating member nonrotatably coupled to said second shaft and rotatably disposed within said plurality of internal conical surfaces included in said first hollow rotating member in a coaxial relationship, wherein series of conical frustum shell spaces are provided intermediate said plurality of internal conical surfaces of said first hollow rotating member and said plurality of external conical surfaces of said second rotating member;

(c) a plurality of sets of concial frustum rollers rotatably and nonorbitably disposed within plurality of said conical frustum shell spaces, each set of said conical frustum rollers disposed in each conical frustum shell space of said plurality of conical frustum shell spaces frictionally coupling rotating movements of said first hollow rotating member and said second rotating member when said conical frustum rollers are simultaneously in contact with one of said plurality of internal conical surfaces of said first hollow rotating member and one of said plurality of external conical surfaces of said second rotating member; and (d) means for selectively establishing a simultaneous frictional contact between one set of said conical frustum rollers and one of said plurality of internal conical surfaces of said first hollow rotating member and one of said plurality of external conical surfaces of said second rotating member;

whereby, rotational motions of said first and second shafts are coupled to one another at various transmission ratios depending on different set of said conical frustum rollers selectively establishing frictional coupling of rotating movements of said first hollow rotating member and said second rotating member.

8. The combination as set forth in claim 7 wherein said simultaneous frictional contact between each set of said conical frustum rollers and said internal conical surface of said first hollow rotating member and said external conical surface of said second rotating member is spring biased.

9. The combination as set forth in claim 7 whrein said combination includes means for simultaneously disengaging frictional contact between all sets of said conical frustum rollers and all of said plurality of internal conical surfaces of said first hollow rotating member and all of said plurality of external conical surfaces of said second rotating member; whereby, said means provides function of clutch.

* * * * *